United States Patent [19]

Lussi et al.

[11] Patent Number: 5,260,118
[45] Date of Patent: Nov. 9, 1993

[54] MATERIALS HAVING A SELECTIVELY APPLIED DECORATIVE ADHESIVE MATRIX

[75] Inventors: Eduard F. Lussi, Ronneby, Sweden; Thomas G. Smith, Easton, Pa.

[73] Assignee: Tarkett Inc., Parsippany, N.J.

[21] Appl. No.: 41,513

[22] Filed: Apr. 1, 1993

Related U.S. Application Data

[63] Continuation of Ser. No. 676,271, Mar. 28, 1991, abandoned, and a continuation-in-part of Ser. No. 333,763, Apr. 3, 1989, Pat. No. 5,015,516, which is a continuation of Ser. No. 773,984, Sep. 9, 1985, abandoned, and a continuation of Ser. No. 362,344, Jun. 6, 1989.

[51] Int. Cl.⁵ .................................................. B32B 9/00
[52] U.S. Cl. .................................... 428/203; 428/204; 428/205; 428/206; 428/207; 428/212; 428/323; 428/327; 428/908.8
[58] Field of Search ............... 428/49, 203, 204, 205, 428/206, 207, 212, 323, 327, 908.8

[56] References Cited

U.S. PATENT DOCUMENTS

| | | | |
|---|---|---|---|
| 2,867,263 | 1/1959 | Bartlett et al. | 154/26 |
| 3,154,461 | 10/1964 | Johnson | 161/116 |
| 3,856,900 | 12/1974 | Erb | 264/9 |
| 4,212,691 | 7/1980 | Potosky et al. | 156/79 |
| 4,278,483 | 7/1981 | Mansolillo | 156/79 |
| 4,599,264 | 7/1986 | Kauffman et al. | 428/264 |
| 4,717,620 | 1/1988 | Bowen et al. | 428/323 |
| 4,916,007 | 4/1990 | Manning | 428/203 |
| 4,983,443 | 1/1991 | Balmer et al. | 428/158 |
| 5,169,704 | 12/1992 | Faust et al. | 428/143 |

FOREIGN PATENT DOCUMENTS

| | | |
|---|---|---|
| 0100595 | 2/1984 | European Pat. Off. . |
| 8701972 | 4/1987 | PCT Int'l Appl. . |
| 8702310 | 4/1987 | PCT Int'l Appl. . |

OTHER PUBLICATIONS

European Search Report, EP 92 30 2061, Dated May 12, 1992.

*Primary Examiner*—Patrick J. Ryan
*Assistant Examiner*—Abraham Bahta
*Attorney, Agent, or Firm*—Brooks Haidt Haffner & Delahunty

[57] ABSTRACT

The invention provides decorative, inlaid sheet materials which incorporate one or more selectively deposited matrix layers of discrete, low aspect ratio particles embedded in a resinous coating. The use of printed patterns which are visible beneath the adhesive matrix containing the particles constitutes one embodiment of the invention. The sheet materials of this invention are real through-patterned inlaids which do not lose their pattern due to wear in use, and which offer unique design advantages and flexibility, as well as superior properties.

20 Claims, No Drawings

MATERIALS HAVING A SELECTIVELY APPLIED DECORATIVE ADHESIVE MATRIX

CROSS-REFERENCE TO RELATED APPLICATIONS

This application is a continuation of application Ser. No. 07/676,271, filed Mar. 28, 1991, now abandoned, and is a continuation-in-part of application Ser. No. 333,763, filed Apr. 3, 1989, that has issued as U.S. Pat. No. 5,015,516, which in turn was a continuation of application Ser. No. 773,984, filed Sep. 9, 1985 and now abandoned, and application Ser. No. 362,344 filed Jun. 6, 1989.

BACKGROUND OF THE INVENTION

1. Field of the Invention

The present invention related to decorative inlaid sheet materials and the like. More particularly the invention is concerned with the use of organic and/or inorganic particles, particularly polyvinyl chloride (hereinafter "PVC") polymerization agglomerates, sometimes referred to herein as resinous particles, as decorative particles and their application on floor and wall covering substrates to produce realistic inlaid patterns, utilizing heretofore unobtainable design strategies and exhibiting superior properties.

The particles are spherical and/or essentially spherical (hereinafter "spheroidal") and are sometimes referred to hereinafter as "pearls." The particles are provided in one or more selectively applied matrix layers which, in some embodiments, overlay a printed design. When an underprinted design in used, a sufficient number of the particles are transparent and/or translucent so that the underprinted design is allowed to show through the matrix layer or layers and the design effects are created by the combination of the underprint and the selectively applied matrix layer or layers. When an underprinted design is not used, the design effects are created only by the selectively applied matrix layer or layers.

2. Description of Related Art

Sheet materials, in particular sheet vinyl flooring products, made with chips or particulate material, are commonly referred to as inlaids. These products and processes for the manufacture are well known in the floor covering business and originate back to the early linoleum times where through patterned floor coverings, based on linseed oil, cork dust and resins were developed by the industry. The process was later modified for vinyl.

Vinyl inlaid floor covering consists of coarse colored particles, such as chips or dry blends, which are "laid on" a substrate and thin sintered by heat, or "laid in" a transparent liquid or solid matrix and fused by heat. The chips are produced from pre-gelled or fused, spread, calendered or extruded compounds cut into geometrically regular profiles or ground int randomly shaped particles.

The dry blends are made by mixing fine PVC powder with plasticizer, stabilizer filler and color pigments and heating above the PVC compound's softening temperature. The small original particles "grow" and form a loose, porous, coarse, fluffy mass.

Currently, to produce realistic inlaid patterns for sheet vinyl, conventional manufacturing procedures distribute the coarse particles on the substrate in different steps with the help of area-complementary stencils, followed by topcoating with a clear wearlayer. This method is complicated and can only be used to produce large geometric patterns.

Inlaid floor coverings are normally characterized as those which maintain their decorative appearance as the surface is worn or abraded away. This characteristic makes such products particularly suitable for use in commercial area where significant wear is encountered.

Modern inlaids generally fall into two classifications: resilients and non-resilients. Resilients include a substantially continuous layer of foam and are usually made by incorporating solid particular material into a plastisol coating, followed by gelling and fusing. Non-resilients do not contain a foam layer and usually are made by sintering and/or calendering, or otherwise compacting, particulate material.

The non-resilient products commercially offered are those containing large (about ⅛ inch) square chips in a clear matrix and those containing small (about 0.004 inch) dry blend resin particles made by sintering and/or compacting normal dry blend resins. It is believed that the reason no products containing chips, granules, or particles of an intermediate particle size (e.g., ranging from about 0.004 inch to about 0.040 inch) are offered results from limitations inherent in current inlaid manufacturing technology, discussed more fully hereinafter.

While construction of inlaid products by compaction from discrete chips or particles (normally of different colors) offers distinct styling opportunities, a significant premium is paid in terms of expensive, cumbersome equipment. Furthermore, the nature of the process restricts the range of designs available. For example, in order to effect specific registered pattern definition, it is necessary to deposit chips of different colors in preselected areas on the sheet. This is difficult mechanically, and results in a slow cumbersome process which does not produce finely defined designs.

Some of the inherent difficulties in current production techniques for non-resilient inlaids have been minimized by use of increasingly sophisticated materials and design techniques, such as using fine particle size, dry blend resins, printing over the surface of the resulting inlaid product, optionally embossing, with and without application of a wearlayer. Unfortunately, whereas the use of the finer particle size preserves the specific characteristics of an inlaid product, i.e., the pattern does not change as the product wear through, overprinting the product, whether or not a wearlayer is applied, essentially engages this characteristic because wearing thorough the print layer essentially destroys the pattern. This eliminates the product from commercial, high-use environments and limits it utility principally to styling effect in the residential and related applications.

Resilient inlaids are usually made by embedding ground plastic particulate material in a plastisol coating. U.S. Pat. No. 4,212,691 exemplifies such products and methods for their manufacture. As taught in this patent, the thickness of the particles or the decorative chips or flakes is stated to be from about 3 mils to about 25 mils (e.g., see column 7, lines 62–64). However, it is the length of the particle, i.e., its largest dimension, rather than thickness that is observed when viewing the pattern. That dimension is stated to be from about 50 to 500 mils at column 8, lines 17–18. It is to be noted that the products disclosed all contain embedded chips or flakes ground from plastic sheet stock, even when chips or flakes from other stock materials are added (e..g, see column 8, lines 4 et seq). These chips or flakes characteristically have a high aspect ratio (i.e., length/thickness).

Thus, existing inlaid technology, although capable of producing commercially satisfactory inlaid products, has limitations and deficiencies. State of the art inlaid technology for "chip" products first grinds the chips from plastic sheets. This predefines the particle shape and is expensive.

Additionally, products formed by compacting or sintering PVC have always shown limited particle distinction due to process limitations and available particle sizes. The particles tend to lose their identity due to agglomeration or lumping caused by the sintering process.

A well known product having commercial applications is made by the Forbo Company in Gothenburg, Sweden. The product, called SMARAGD, is a vinyl sheet floor covering. SMARAGD is comprised of a solid PVC substrate reinforced with a non-woven glass fiber web. A foamable plastisol is applied in a random pattern followed by a clear vinyl coating containing evenly dispersed colored particles. The colored particles are generally low aspect ratio beds. Finally, an overcoating wearlayer of PVC is applied. The product does not embody a printed pattern or design.

When particles are admixed with a liquid plastisol composition prior to application to a surface, as in the product of SMARAGD, it is not possible to obtain a dense coating of the particles. This is due to viscosity and other interfering factors inherent in the plastisol. As a practical matter, therefore, the maximum density of the particles is limited to about 15-20% by volume. Total particle coverage in the final product is, therefore, effectively unattainable.

It has now been found in accordance with the present invention that durable inlaid floor coverings having unique design effects can be made by selectively applying one or more adhesive matrix layers to a substrate material which optionally may e printed with a uniform random print or a pattern or design. When the substrate is printed with a pattern or design, the matrix layer or layers may be selectively applied in register therewith. When a uniform random print or no underprint is used, design effects are created with the selectively applied matrix layer or layers.

SUMMARY OF THE INVENTION

In accordance with this invention, a decorative, inlaid floor or wall covering product is provided which incorporates as the essential elements thereof (i) an optional printed layer in the form of a uniform random print or a pattern or design overlaying a substrate, (ii) particles having an aspect ratio significantly lower than those currently employed in inlaids commercially offered in the United States and a particle size, preferably falling with the range of from about 0.004 inch to about 0.040 inch, (iii) one or more selectively applied adhesive layers in which said particles are embedded to make one or more adhesive matrix layers, and (iv) other optional elements such as a substrate coating or sealant and a wearlayer. Such optional elements will be discussed more fully hereinafter.

The particles employed in this invention have an aspect ratio of no greater than about 2:1 and, preferably, no greater than about 1.5:1. Particles having an aspect ratio of about 1:1 and, in particular, spheroidal particles, are especially preferred because of the excellent results achieved therewith, as discussed more fully hereinafter. The use of particles which are essentially as thick as they are long, i.e., having a low aspect ratio, provides a product that will not lose its decorative design effects due to wear in use, thus preserving the unique property which characterizes true inlaids.

In one embodiment, the use of printed patterns or designs which are visible beneath the selectively applied adhesive matrix layers containing the particles broadens the options available to the pattern designer. Exemplary is a decorative, inlaid floor or wall covering which comprises:

a) a substrate, b) an optional latex layer overlaying and in contact with the substrate, c) a printed layer, generally comprising a printable substrate coating or sealant onto which is printed a pattern of design in an ink suitable for floor or wall covering applications, overlaying and in contact with said substrate or optional latex layer, and d) a selectively applied adhesive matrix layer, overlaying said printed layer in register with the pattern or design, and in contact therewith, in which are embedded low aspect ratio particles, said selectively applied adhesive matrix layer being sufficiently transparent or translucent to permit the underprint to show through. Effective transparency or translucency is achieved either 1) by using a sufficient proportion of transparent and/or translucent particles to opaque particles so that the underprint can shown through the particles themselves when a dense loading of particles used in accordance with the invention which particles otherwise would effectively prevent the underprint from showing through interstices between the particles or 2) when a less dense loading of particles is used, the underprint can show through interstices between the particles and through any translucent and/or transparent particles which might be used.

Such product provides options for a wide variety of design strategies heretofore unobtainable with state-of-the-art sheet vinyl technology and constitutes a preferred embodiment of this invention.

The inlaid products of this invention offer unique design advantages. Further, cost advantages can be realized by utilizing raw materials which are believed to be unique to inlaid manufacture. For example, certain of the novel products of the invention incorporate an adhesive matrix consisting essentially of a plastisol layer containing transparent and/or translucent and colored spheroidal particles, which, preferably, range in size from about 0.004 inches to about 0.040 inches. When this matrix is applied over a printed pattern, a unique visual effect is produced.

Such particles can be made in uniform controlled sizes by employing technology described in U.S. Pat. No. 3,856,900, the entire contents of which are incorporated herein by reference. Alternatively, special large particle size dry blend resinous particles, either screened to the desired size ranges of this invention from oversized material obtained from normal production variations, or specially made particles in the desired size range, can be utilized.

Another, embodiment of this invention is a decorative, inlaid floor covering which comprises in the following order:

a) a non-asbestos felt sheet substrate, b) an optional latex layer which can optionally be tinted or dyed, c) optionally a gelled, optionally foamed, printable, plastisol coating over said substrate which can optionally be tinted or dyed, d) optionally, one or more inks applied to the surface of the substrate, latex layer or plastisol coating either in a uniform random print or in a pattern or design, e) multiple adhesive matrix layers, overlaying said substrate, latex layer, plastisol coating, or print layer, and in contact therewith, in each of which are embedded discrete spherical and essentially spherical particles wherein the adhesive used to make one, some, or all of the selectively applied adhesive matrix layers is transparent or optionally contains a colorant or dye which makes it translucent; the compositions, sizes and colors of the particles embedded in each adhesive matrix layer are the same or different, and for each adhesive matrix layer, either 1) a dense loading or particles is used wherein a sufficient proportion of transparent and/or translucent particles to opaque particles are present so that the optional underprint or unprinted undercoating or substrate can show through the particles themselves and essentially not show through interstices between the particles; 2) a less dense loading of particles is used so that the optional underprint or unprinted undercoating or substrate can show through interstices between the particles and through any translucent or transparent particles which might be used; or 3) a dense loading of particles is used which effectively prevent the optional underprint or unprinted undercoating or substrate from showing through; provided that the particle loading and transparency/translucency features of 1), 2) and 3) above can be the same or different for each adhesive matrix layer and said adhesive matrix layers can be in or out of register with each other and/or any underprinted pattern or design, and f) optionally, a fused, transparent, plastisol wearlayer as a top coat

DESCRIPTION OF THE PREFERRED EMBODIMENTS

The product is comprised of a base supporting material, which, optionally, may be precoated with a latex and/or a plastisol to enhance printability, an optional print layer offering decoration, and one or more selectively applied adhesive matrix layers containing spheroidal particles, wherein the particles can be transparent, translucent and/or opaque. In one embodiment, the resultant product has an additional coating on its top surface to enhance surface properties, such as gloss and the like, and insure there is no residual porosity resulting from the process of embedding the particulates into the adhesive matrix layer.

The incorporation of particulate materials of such size and shape, and at the loadings herein described, provides the retention of pattern as the product wears through, which is characteristic of inlaid products. The incorporation of transparent and/or translucent particles allowing the underprint to show through in some embodiments, provides an additional dimension in design capability. The combination of a transparent and/or translucent selectively applied adhesive matrix loaded with transparent and/or translucent and/or pigmented particulate material and the use of rotogravure or other forms of print offering fine registered detail and definition, provided a product which is believed to be unique and a significant advance in the art.

One of the advantages of this invention is that it employs ingredients and processing technology well known to those skilled in the art. Also, by employing a fluid plastisol as the matrix material binding the particles together, the product can be manufactured without the need for the high pressures or temperatures characteristic of the calendering or agglomeration steps of the prior art processes. This processing characteristic also distinguishes the subject process from those of the prior art which employ only dry blend resins, which are agglomerated through heat sintering.

Substrate

The substrate is a relatively flat fibrous or non-fibrous backing sheet material, such as a fibrous, felted or matted, relatively flat sheet of overlapping, intersecting fibers, usually of non-asbestos origin. The substrate can, if desired, be asbestos or non-asbestos felts or papers, woven or non-woven; knitted or otherwise fabricated textile material or fabrics comprised of cellulose, glass, natural or synthetic organic fibers, or natural or synthetic inorganic fibers, or supported or non-supported webs or sheets made therefrom or filled or unfilled thermoplastic or thermoset polymeric materials. These and other substrate or base materials are well known in the art and need not be further detailed here.

Substrate Coating

The substrate or base material optionally can be coated with carriers for smoke suppressants and/or flame retardants and/or to improve the print quality of the substrate. Such coatings can be plastisols, organosols, lacquers, filled or unfilled latex coatings, and/or other coatings conventionally employed as preprint sealants in the manufacture of floor or wall covering products.

The optional latex layer, is a smooth coating which may be colored or not colored, filled or unfilled. In a preferred embodiment, the latex is tinted with a color which is compatible with the colors of any printed pattern or design and/or the particles used to create design effects. Most preferably, the latex layer is tinted with a color which is the average of the colors of the overall product design. To one skilled in the art, the average color means the color perceived when one looks at a surface from a distance of more than about 5 feet. Also, the latex layer is preferably used as a carrier for flame retardant and smoke suppressant compositions.

The latex layer is substantially uniformly coated over the substrate to a thickness from about 1 to about 4 mils, preferably from about 1.5 to about 2.5 mils. Conventional means for coating the substrate with the latex layer can be used and are not critical to the invention. Such means include an air knife, a rotogravure roller with a plain etch or knurled roll, rotary screen, drawdown bar, or wire wound bar (wherein the grooves provided by the wires assist in metering the flow of the latex). Following application of the latex layer, it is dried prior to further processing. This can e accomplished in a hot air oven at a temperature from about 2252 to about 350° F. preferably from about 275° to about 300° F., for from about 4 minutes to about 30 seconds, preferably from about 2 minutes to about 30 seconds. Lower temperature and longer times may be used as long as conditions are adequate to remove water. Higher temperatures and shorter times may also be used with sufficient air velocity as long as the latex layer is not caused to bubble. The latex layer can be made from any commonly available latex formulation as long as it is compatible with the substrate and the layer overlaying the latex layer. The latex composition preferably should have minimal smoke generating properties and should be moisture resistant and have good aging properties. It should also have good adhesion compatibility with the layer overlaying it. Suitable latex include crosslinkable ethylene vinyl acetate latexes, crosslinkable acrylic latexes, ethylene vinyl chloride emulsions, PVC and polyvinyl acetate latexes, copolymer latexes, and butadiene-acrylonitrile latexes.

When the latex layer is tinted, a color pigment may be used which is chemically compatible with the latex composition and the other components of the product. Suitable color pigments include inorganic or mineral pigments such as titanium dioxide, chromium trioxide, cadmium sulfide, iron oxide, carbon black and the like.

A plastisol layer can be used instead of the latex layer or can be applied over the latex layer. This layer can also be tinted if desired in the same manner as explained above with reference to the latex layer.

As used herein, the term "plastisol" is intended to cover a relatively high molecular weight polyvinyl chloride resin dispersed in one or more plasticizers. The plastisol upon heating or curing forms a tough plasticized solid. For purposes of the present invention, plastisol compositions are intended to include organosols, which are similar dispersed polyvinyl chloride resin materials that, in addition, contain one or more volatile liquid that are driven off upon heating.

Those skilled in the art will appreciate that, in addition to the basic resin constituents, other commonly employed constituents can be present in the plastisol compositions in minor proportions. Such other constituents commonly include heat and light stabilizers, viscosity depressants, and/or pigments or dyes, the latter in order to contribute color to the polyvinyl chloride resin.

Typically when a plastisol substrate coating is employed in the products of this invention, it is a resinous polymer composition, preferably, a polyvinyl chloride plastisol which is substantially uniformly applied to the substrate surface, for example, by means of a conventional reverse roll coater or wire wound bar, e.g., a Meyer Rod Coater. The particular means for applying the plastisol coating to the underlying surface does not relate to the essence of the invention and any suitable coating means can be employed. Exemplary of other coating means are a knife-over roll coater, rotary screen, direct roll coater and the like.

The thickness of the resinous polymer composition or plastisol, as it is applied to the underlying surface, is substantially uniform, and is in the range from about 1.5 mils to about 30 mils, 1.5 mils to about 12 mils being especially preferred.

Although the preferred and typical substrate coating is a polyvinyl chloride homopolymer resin, other vinyl chloride resins can be employed. Exemplary are a vinyl chloride-vinyl acetate copolymer, a vinyl chloride-vinylidene chloride copolymer and copolymers of vinyl chloride with other vinyl esters, such as, vinyl butyrate, vinyl propionate, and alkyl substituted vinyl esters, wherein the alkyl moiety preferably is lower alkyl containing between about 1-4 carbons. Other suitable synthetic resins such as polystyrene, substituted polystyrene, preferably wherein the substituents are selected from the group consisting of alkyl ($C_1$-$C_{10}$, preferably $C_1$-$C_4$), aryl (preferably, $C_6$-$C_{14}$), polyolefins such as polyethylene and polypropylene, acrylates and methacrylates, polyamides, polyesters, and any other natural or synthetic resin capable of being applied to the substrate or base coatings of this invention to provide a smooth and uniform surface and/or to improve the print quality of the substrate or base coating surface, are also applicable; provided such resin is otherwise compatible with the overall product composition and, therefore, within the principles of this invention. Thus, it is not essential that a plastisol always be used. Organosols and aqueous latices (aquasols and hydrsols) are also of use, employing as the dispersing or suspending media, organic solvents and water, respectively, rather than plasticizers, as in the case of a plastisol.

Where the preferred plastisol is employed, typical of the plasticizers which can be used are dibutyl sebacate, butyl benzyl sebacate, dibenzyl sebacate, dioctyl adipate, didecyl adipate, dibutyl phthalate, dioctyl phthalate, dibutoxy ethyl phthalate, butyl benzyl phthalate, dibenzyl phthalate, di(2-ethylhexyl) phthalate, alkyl or aryl modified phthalate esters, alkyl, aryl, or alkylaryl hydrocarbons, tricresyl phosphate, octyl diphenyl phosphate, dipropylene glycol dibenzoate, dibasic acid glycol esters, and the like. Other constituents of the resinous substrate coating can include a blowing or foaming agent such as azodicarbonamide (if a blowing or foaming procedure is desired), conventional stabilizers/accelerators, initiators, catalysts, etc., such as zinc oleate, dibasic lead phosphite, etc., conventional heat or light stabilizers, such as metallic soaps, etc., ultraviolet absorbers, colorants, dyes or pigments, notably, titanium dioxide, solvents and diluents, such as methyl ethyl ketone, methyl isobutyl ketone, dodecyl benzene, etc., fillers, such as clay, limestone, etc., viscosity modifiers, antioxidants, bacteriostats and bactericides, and the like.

After the plastisol layer is applied to the substrate, the combination is heated for a period of time and at a temperature sufficient to gel the plastic composition, but not sufficient to activate or to decompose any blowing or foaming agent which may be present. This can e done in an oven or on a heated chrome drum. If an oven is used for the gelling step, a residence time in the oven from about 0.5 minutes to about 3.5 minutes at an oven temperature from about 320° F., to about 250° F., will give good results. If a chrome drum is used, a dwell time on the drum of from about 8 seconds to about 30 seconds at a drum temperature of from about 310° F. to about 240° F. will give good results. The higher temperatures are used with shorter residence or dwell times and lower temperatures with longer times. The layer is then cooled to form a pre-gel which provides a surface suitable for printing. Cooling is generally accomplished by contacting the surface of the foamable, gelled plastic layer (and sometimes the underside of the substrate) with one or more cooling drums. Ambient or chilled water is circulated through the drums. Cooling may be enhanced with the use of fans or blowers.

Optional Print Layer

The optional print layer is applied in a uniform random print or in the form of a pattern or design and can be applied directly to the substrate. If latex and/or plastisol layers are used, the print layer will be applied to the uppermost such layer. The print layer can be comprised of one or more layers of ink.

Suitable printing inks include those normally used in the manufacture of floor covering, preferably resilient floor covering. These include plastisol solvent based systems and water based systems. Such system can include a chemical suppressant in those cases where the substrate in which the ink is to be applied is a foamable plastisol or organosol. Such suppressants are well known in the art (e.g., see U.S. Pat. No. 3,293,094). Ultraviolet curable printing inks can also be used.

The printing ink may be pigmented or non-pigmented and may include organic pigments or inorganic pigment particles such as titanium dioxide, chromium trioxide, cadmium sulfide, iron oxide, carbon black, mica and the like. Decorative reflective particles may also be included as part of the printing ink composition or may be separately applied either randomly or by selective deposition in the form of a pattern or design.

Printing can be effected by rotary screen, rotogravure, flexigraphic, screen printing, or other printing techniques conventionally employed in making floor or wall covering products.

Selectively Applied Adhesive Layer or Layers

The adhesive layer or layers are normally a plastisol or organosol additionally containing a plasticizer system, associated diluents, viscosity control aids and stabilizers. Those discussed above are exemplary. The adhesive layer or layers also can include a chemical suppressant in those cases where the substrate is a foamable plastisol or organosol. The chemical suppressants, which are well known in the art, can be used whether or not the substrate is printed.

Although other homopolymers and copolymers of vinyl chloride, (i.e., vinyl resins other than a plastisol or organosol) such as those discussed above, can also be employed, as a practical matter, current economics dictate the use of polyvinyl chloride plastisols of the type set forth in the examples hereinafter.

Each adhesive layer is selectively applied using a rotary screen, flat bed screen or other suitable techniques. After one adhesive layer is applied, particles are randomly applied over the surface of the layer and embedded into it, and it is gelled to make an adhesive matrix layer as described below. Excess particles are removed by vacuuming or other suitable means either prior to or following the embedding step. Such excess particles may include those which are applied over the spaces which are not coated with the adhesive and/or those which do not adhere to or are not embedded in the adhesive. After gelling, a subsequent adhesive layer can be applied followed by the same sequence of applying particles, removing excess particles, embedding particles and gelling. This series of steps is repeated for each successive, selectively applied, adhesive matrix layer. In an alternative embodiment, some or all of the selectively applied adhesive matrix layers can be made by admixing particles with the adhesive before it is applied, followed by gelling. As explained above, when multiple adhesive matrix layers are used they can optionally be in register with one another and/or with any underprinted pattern or design.

The thickness of each selectively applied adhesive layer as it is applied to the substrate, latex layer, plastisol coating or print layer is substantially uniform, and is in the range of about 2 mils to about 30 mils, 5 mils to about 20 mils being especially preferred. The layer can be thinner or thicker as may be required by the particular product application, as long as it is thick enough to accommodate the layer of particles which subsequently will be embedded into it.

Particles

The particles of this invention are spherical or essentially spherical, (sometimes referred to herein as "spheroidal") and have an aspect ratio no greater than about 2:1, and preferably no greater than about 1.5:1, which is required to obtain the desirable design effect this invention is capable of providing.

The particles can be comprised of various homogeneous or heterogeneous organic or inorganic materials or mixtures thereof and can be transparent, translucent or opaque. Suitable particles can be made from any one, or a combination or mixture of mica, ceramics, metals, rubbers, and polymeric and resinous compositions such as acrylics, plastisols, polyamides, polyolefins, polycarbonates, polyvinyl chloride and copolymers thereof, and polyesters. Particles made from resinous compositions, i.e., resinous particles, may include compounded materials having fillers such as calcium carbonate. Each translucent or opaque particle can contain its own individual colorant, dye or pigment.

It is preferred to employ discrete spheroidal particles for enhanced visual effect of depth and improved wear characteristics. Illustrative of those spheroidal particles are the particles and the methods for their manufacture taught in the U.S. Pat. No. 3,856,900. This procedure is particularly convenient for the production of relatively small plastisol beads or "pearls" having a particle size of generally about 0.020 inch or smaller.

The particles can be obtained by screening the oversized particles from normal suspension grade resin production or by making special particle sizes, for example, in accordance with U.S. Pat. No. 3,856,900. Particles can also be produced from other processed compounds such as extruded or calendered PVC which is subjected to a grinding process to produce particles having suitable sizes and aspect ratios. Particles in the preferred size range of from about 0.004 to about 0.040 inch are particularly useful for achieving certain desirable design effects.

A preferred method of making the spheroidal resinous particles is to dry blend PVC powder by agitating it in a container provided with a propeller agitator, such as a Henschel Mixer, at a speed of up to about 3,000 r.p.m., until it reaches a temperature of about 160° F. The speed is then lowered to about 500 r.p.m. during addition of the PVC plasticizer, stabilizer and optionally, a color dispersion. The agitator speed is then increased to about 3,000 r.p.m. until the temperature of the mixture reaches about 230° F. Then the agitator speed is lowered to allow to cooling to about 100° F. and the spheroidal resinous particles thereby produced are discharged.

Other methods of making the spheroidal resinous particles include ribbon blending or paddle blending to dry blend the PVC powder in a manner similar to that described above.

It has been found that the size of the particles employed in carrying out this invention have a pronounced effect on the results obtained. Use of relatively small particles, e.g., ranging from about 150 microns (100 mesh) to about 600 microns (30 mesh) are most advantageous in producing the desired design effects. Particles, especially spheroidal particles, averaging about 400-600 microns (by microscopic observation) are especially preferred.

When a sufficient loading of particles is used to essentially completely cover the underlying material and the particles are resinous, they are deposited at a minimum density of about 0.3 pounds per square yard, with from about 0.4 to about 0.8 pounds per square yard being preferred. A density from about 0.55 to about 0.65 pounds per square yard is most preferred. When this embodiment is used in a product having an underprint, one must consider the ratio of transparent to colored particles which will determine the visibility of the printed pattern underneath the resulting adhesive matrix. Generally, 75% or less, and preferably 25-55% transparent and/or translucent to colored particles loading is preferred. The amount actually used will, of course, depend upon the type of end-use application and design effect desired. Good results have been achieved in the range of 35-45% transparent and/or translucent to colored particle loading.

The particles can be applied over each selectively applied adhesive layer, making a layered intermediate product, following the methods disclosed in U.S. patent application Ser. No. 362,344, filed Jun. 6, 1989, one of the parents of the present application. Known apparatus such as a magnetic vibrating pan or trough or a VILLARS powder coater made by Villars Maschinenbau, Muenchwilen, Switzerland can be used. A particularly preferred means is to use a dry material dispensing machine of the type disclosed and claimed in U.S. Pat. Nos. 3,070,264 and 3,073,607 to Christy. Machines of this type are available from the Christy Machine Company, P.O. Box 32, Fremont, Ohio. The Christy "COAT-O-MATIC" (also called the "SIEVE-O-DUSTER") is particularly preferred.

The COAT-O-MATIC is normally used by the food industry to apply things like poppy seeds on rolls, sugar on cookies, and the like. However, it can easily be modified by one skilled in the art to uniformly deposit spheroidal particles in the production of floor coverings. The modifications are required to improve the uniformity of application of the spheroidal particles. In particular, the ability to make adjustments must be refined and vibrations and deflections must be reduced.

We bound that the following modifications to the COAT-O-MATRIC made it suitable for depositing particles in accordance with this invention:

1. A larger diameter, knurled dispensing roll is used to reduce deflection and eliminate wobble which otherwise causes recurring bands of light and heavy application of the spheroidal particles. The dispensing roll should have a total indicated run-out of less than or equal to about 0.010 inch, deflection due to weight of less than or equal to about 0.030 inch and a balance of less than or equal to about 2 inch ounces. The rigidity of the dispensing roll should be sufficient to prevent "galloping" (where the roll remains deflected in one orientation; thereby causing it to rotate like a banana).

2. An adjustable rubber applicator blade mounted on a reinforced holder is used to provide refined adjustment of the pressure for uniform application across the width of the machine.

3. Adjustment means are added to the brush holder to provide adjustment of pressure on the brush across the width of the machine.

4. Reinforcement of the hopper is required to limit deflections along its length. Deflections less than or equal to about 0.030 inch being preferred.

The foregoing modifications can be made by various means by those skilled in the art consistent with the objectives set fort above and elsewhere in this specification.

The density of particles deposited using the modified COAT-O-MATIC can be adjusted for a given line speed by varying the speed of rotation of the dispensing roll.

The deposited particles are embedded in each adhesive layer as described below.

Embedding the Spheroidal Particles in the Adhesive Layer and Gelling the Adhesive Layer When the spheroidal particles are embedded in the adhesive layer, the adhesive layer is simultaneously gelled, thereby forming a matrix layer of spheroidal particles in a gelled adhesive. This can be achieved by heating the intermediate product in an oven at a temperature from about 260° to about 350° F., preferably from about 275° to about 300° F., for from about 4 minutes to about 1 minute, preferably from about 2.5 to about 1.5 minutes. In a preferred embodiment of the invention, however, embedding and gelling are achieved by using a hot chrome drum provided with a pressure belt as described in U.S. Pat. No. 4,794,020 to Lussi, et al. The drum is heated to a temperature from about 260° to about 350° F., preferably from about 275° to about 320° F. The intermediate product is maintained in contact with the drum for from about 3 minutes to about 10 seconds, preferably from about 60 to about 15 seconds. In another embodiment, supplementary heat can be used, e.g., infrared or the like, prior to heating in an oven or on a drum, thereby shortening the heating times set forth above.

Gelling conditions will also vary with the molecular weighty of the resin and other properties such as the solvating properties of the resin and plasticizer. Those skilled in the art will recognize the importance of applying sufficient heat to gel each adhesive layer, while avoiding the excessive heat which could damage the product.

Plastisol Wearlayer

An essentially smooth coating of plastisol can optionally be applied over the selectively applied adhesive matrix layer or layers. This coating is substantially uniformly applied to the underlying surface by conventional means such as a knife-over roll coater, direct roll coater, rotary screen, draw down bar, reverse roll coater or wire wound bar. The particular means for applying the coating does not relate to the essence of the invention and any suitable coating means can be employed. The smooth coating of plastisol can then be gelled in an oven or with a hot chrome drum under the same conditions as described above with reference to gelling the adhesive layer. A plastisol wearlayer is thereby secured to the underlying surface. This process can be repeated to provide additional wearlayer as desired. The plastisol wearlayers can have a thickness of from about 2 to about 100 mils, and preferably have a thickness of from about 10 to about 40 mils.

In one embodiment, two clear plastisol wearlayers are used. After the first wearlayer is applied and gelled using a hot chrome drum, it is embossed at a temperature which will allow the embossing to be reversed upon the subsequent application of heat. The a second plastisol layer is applied followed by using in an oven. This causes the stressed created by embossing in the first wearlayer to relax, thereby causing a reverse embossing effect in the second wearlayer. A reverse embossed wearlayer is amenable to easy cleaning.

Urethane Wearlayer

Polyurethanes can also be used for wearlayers in accordance with the invention. They can be used instead of plastisol wearlayers or in addition to them. A smooth coating of polyurethane can be applied using the same means as those used to apply smooth coatings of latex. Polyurethane can also be applied by laminating it onto another substrate and applying it to a surface with an adhesive.

Depending upon the chemistry of the polyurethane, the polyurethane layer can be cured by heat, chemical reaction, ultraviolet light or electron beam radiation. A preferred means is high energy ultraviolet light.

The cured polyurethane layer can be from about 0.1 to about 10 mils thick and is preferably from about 0.25 to about 4 mils thick. Additional layers of polyurethane can be used if desired. In a preferred embodiment of the invention, one polyurethane wearlayer is applied over the reverse embossed plastisol wearlayer described above.

The composition of the polyurethane wearlayer can include any number of commercially available formulations as long as they are compatible with the other components of the floor covering of the invention and the objectives of the invention as set forth in this specification. Common urethane oligomers include polyester, polyether, epoxy-acrylic and polyamides. The most preferred types ar urethane-acrylo based oligomers diluted with acrylic monomers and containing photoinitiators to provide the means for radiation curing. This is considered to be a thermoset polymer system in that the oligomer are unsaturated resins with functional groups that interact with each other and with the monomers providing chemical linkages during the polymerization process. The reactions are terminated by photopolymerizable groups made available on the interacting components. The chemical linkages that are created between groups and polymer chains characterize the radiation cured urethanes as thermoset materials as opposed to thermoplastic polymers in which functional groups either do not exist or do not interact. The thermoset properties are unique in that urethane films will not remelt when heated and in general exhibit a harder, more inert character than thermoplastic polymers. Normally, they will provide better scuff resistance and retained gloss when compared with the common thermoplastic PVC alternative.

Flame Retardant and Smoke Suppressants

Conventional flame retardants and smoke suppressants which are compatible with the various materials used in accordance with the invention can be added at any stage of the process. They can be impregnated into the substrate, admixed with the latex layer, the plastisol layer and/or the adhesive layer, and/or admixed with any of the plastisol and/or urethane wearlayers. Spheroidal resinous particles and other types of spheroidal particles containing such compositions can also be manufactured for use in accordance with the invention. In the preferred embodiment of the invention, effective quantities of flame retardants and smoke suppressants are admixed with the latex layer and/or one or more of the plastisol layers.

Flame retardants and smoke inhibitors which can be used in accordance with the invention include aluminum trihydrate, zinc borate, magnesium hydroxide, antimony trioxide, phosphates and other compounds and compositions which are compatible with the various constituents of the products of the present invention. They are added in effective amounts which will be apparent to those skilled in the art based on manufacturers specifications and code requirements.

Static Dissipation

In order to adjust the electrical properties of the product of the invention, the formulation of the coating used in each layer and the composition of the substrate may need to be modified. The objective is to lower the resistance (raise the conductivity) of the product. Standards and testing procedures for surface to surface and surface to ground resistance for floor coverings are well known in the industry. A preferred range for the products of the invention is 1,000,000 to 1,000,000,000 ohms as tested per ASTM F-150-72 (standard test method for electrical resistance of conductive floor covering). This test is conducted at 500 volts direct current and 50% relative humidity.

In the preferred embodiment of the invention, carbon fibers are incorporated into the substrate to lower is resistance. Antistatic agents that can be added to the latex layer, adhesive layer and wearlayers are commercially available and known in the art. Suitable antistatic agents include Nopcostate HS, an ethoxylated composition from Diamond Shamrock and Tebestat IK 12, a nonionic substituted polyether from Dr. Th. Boehme KG, Chem. Fabric GMBH & CO., 8192 Geretsried 1, German. The particular compositions used are not critical as long as they are compatible with the other components present in the durable inlaid floor coverings of the invention. The antistatic agents may be added in various amounts as will be apparent to those skilled in the art depending on recommendations of the manufacturers of said compositions and the desired specifications for the floor covering product. A polyurethane wearlayer is not used in the preferred static-dissipative embodiment of the invention.

EXAMPLES

In the following examples all parts and percentages are by weight.

EXAMPLE 1

Floor Covering Printed With Simulated Brick Pattern Suitable for Commercial Uses A floor covering substrate sheet of conventional type nonasbestos felt (Tarkett Inc., Whitehall, Pa.), approximately 32 mils thick, is bar coated (wire wound bar) with approximately 3 mils of a layer of white printable plastisol, the composition of which is as follows:

|  | Parts by Weight |
| --- | --- |
| PVC dispersion resin: k value 62 (Occidental FOC 605) | 70 |
| PVC extender resin: k value 60 (PLIOVIC M-50) | 30 |
| Di(2-ethylhexyl) phthalate | 30 |
| Butyl benzyl phthalate | 30 |
| Titanium dioxide | 5 |
| Crystalline calcium carbonate | 80 |
| Barium-zinc type stabilizer | 3 |

-continued

| | Parts by Weight |
|---|---|
| (SYNPRON 1492) | |

After gelling against a heated chromium drum at 300° F., the resulting smooth surface is gravure printed on a flat print press using solvent based inks of the following composition:

| | Parts by Weight |
|---|---|
| PVC-polyvinyl acetate copolymer | 100 |
| Pigments | 180 |
| (A purchased blend of colors selected from red iron oxide, yellow iron oxide, chrome yellow, molybdate orange, carbon black, titanium dioxide, quinanthrone red, phthallo blue and phthallo green.) | |
| Solvent | 600 |
| (Methyl ethyl ketone/xylene) | |
| Dispersion aid | 2 |

After drying in warm air at about 140° F., an adhesive layer about 20 mils thick is selectively applied in register with the simulated bricks by a rotary screen and an excess of premixed plastisol pearls (produced in Example 3 and having the composition set forth hereinafter), about half of which are transparent and the remainder colored with about 50-50 blend of red brick color and white color, are evenly distributed over the surface from a vibrating pan SYNTRON vibrator manufactured by FMC Corp.) to a density of about 0.60 pounds per square yard. The composition of the adhesive mix is:

| | Parts by Weight |
|---|---|
| PVC dispersion resin: k value 68 (Occidental OXY 68 HC) | 70 |
| PVC extender resin: k value 60 (PLIOVIC M-50) | 30 |
| Butyl benzyl phthalate | 25 |
| Di-isononyl phthalate | 25 |
| Stabilizer, barium-zinc type (SYNPRON 1492) | 4 |

The composition of the pearl particles is:

| | Parts by Weight | |
|---|---|---|
| | Colored | Transparent |
| Suspension grade PVC resin: k value 65 (PEVIKON S658 GK) | 100 | 100 |
| Butyl benzyl phthalate | 40 | 40 |
| Stabilizer, barium-zinc type (SYNPRON 1665) | 4 | 4 |
| Titanium dioxide | 5 | — |
| Conventional Color-pigment | 5 | — |

The PEVIKON S658 GK resin has an aspect ratio of about 1 (the particle are round) and the particle size is found by microscopic observation to average about 400–600 microns (approximately 30–40 mesh). Screen analysis is as follows:

| Mesh | % Retained |
|---|---|
| 30 (500–800 microns) | 10 |
| 40 (400–600 microns) | 60 |
| 60 (250–400 microns) | 29 |

| Mesh | % Retained |
|---|---|
| Thru 100 mesh | 1 |

The excess pearls, which are not wetted by the adhesive coating and embedded therein are vacuumed away. The resultant selectively applied grainy matrix is then gelled by contacting the coated side against a heated chromium drum (350° F.) and smoothed between a rubber pressure roller and the drum surface. The thickness of the matrix containing the adhesive coat (12 mils) and the embedded pearls (approximately 23 mils) is 25–30 mils.

Another adhesive layer is selectively applied by a rotary screen in register with the grouting between the simulated bricks and an excess of premixed plastisol pearls of the same type as used above, about half of which are transparent and the remainder colored with about a 50-50 blend of gray color and white color, are evenly distributed over the surface from the vibrating pan to a density of about 0.60 pounds per square yard of coated area. Excess pearls are removed and the selectively applied grainy matrix is gelled as above.

The surface of the matrix was then bar coated using a drawdown bar with a transparent plastisol wearlayer having the following composition:

| | Parts by Weight |
|---|---|
| Dispersion grade PVC, k value 68 (Occidental OXY 68 HC) | 100 |
| Monsanto SANITIZER S-377 plasticizer | 56 |
| Stabilizer, barium-zinc type (SYNPRON 1665) | 5 |
| Epoxidized soybean oil | 5 |
| Kerosene | 2 |

The wearlayer is fused in a hot air oven at 380° F. for 3.5 minutes and then embossed between a cooled embossing roll and a rubber pressure roll. The resultant wearlayer has a thickness of about 15 mils.

EXAMPLE 2

Commercial Floor Covering With Registered Printed and Embossed Patterns (Chemically Embossed)

A floor covering substrate sheet of conventional type non-asbestos felt (Tarkett Inc., Whitehall, Pa.) approximately 32 mils thick is coated with a foamable plastisol the composition of which was as follows:

| | Parts by Weight |
|---|---|
| PVC dispersion resin: k value 62 (Occidental FPC 605) | 70 |
| PVC extender resin: k value 60 (PLIOVIC M-50) | 30 |
| Di(2-ethylhexyl) phthalate | 28 |
| Butyl benzyl phthalate | 15 |
| Texanol isobutyrate (TXIB) | 15 |
| Titanium dioxide | 10 |
| Azodicarbonamide | 2.5 |
| Kerosene | 4 |
| Zinc oxide | 1.5 |

The coated substrate is then pregelled in a hot oven at 275° F. for 2.5 minutes. The surface is then gravure printed on a flat bed press using solvent based PVC and PVC-polyvinyl acetate copolymer inks having the same composition as those of Example 1 except that the inks used to cover the plate printing the valley areas of the pattern (i.e., the grouts) contain benzotriazole, a chemical suppressant, to inhibit in these selected area the expansion of the foamable plastisol.

After drying the print, selectively applied adhesive matrix layers having the same compositions as those of Example 1 are applied coated and embedded with pearls and gelled in the same manner as those of Example 1. The thickness of the resulting matrixes containing the pearls embedded in the adhesive are each about 25-30 mils. Approximately 10 mils of a transparent wearlayer having the same composition as that of Example 1 was applied with a drawdown bar. The resulting product was then fused and expanded (i.e., foamed) in a hot air oven at 380° F. for 3 minutes.

The floor covering produced shows a relief structure (embossing) in register with the printed areas. The decorative inlaid product thereby produced has an overall thickness of about 86 mils and exhibits excellent wear and design characteristics.

EXAMPLE 3

The plastisol spherical "pearls" used in the foregoing examples are prepared using the following formulations:

|  | Parts by Weight | |
|---|---|---|
|  | Colored | Transparent |
| Suspension grade PVC resin, course: k value 65 (PEVIKON S658 GK) | 100 | 100 |
| Butyl benzyl phthalate | 40 | 40 |
| Stabilizer, barium-zinc type (SYNPRON 1665) | 4 | 4 |
| Titanium dioxide | 5 | — |
| Color-pigment | 5 | — |

In preparing the colored and transparent plastisol composition, the PVC resin (at 70° F.) is charged to a high intensity mixer running at 3500 revolutions per minutes (r.p.m.) and mixed until the batch temperature reached 160° F. (about 10 minutes). The speed of the mixer is then reduced to 500 r.p.m and the pigment pastes, plasticizer and stabilizer are added slowly over a period of about 5 minutes. The speed is then increased to 2000-3000 r.p.m. and the material mixed until the batch temperature reaches 260° F. (approximately 15 minutes additional). The speed is then reduced to 500 r.p.m. and the material is mixed until the batch temperature is cooled to 70°-90° F. (about 30 additional minutes).

The pearls produced are essentially spherical, dry and free running, do not exceed 0.040 inches in diameter and generally have a particle size distribution range of 0.004 to 0.030 inches.

The following table summarizes the process parameters: Equipment: High intensity mixer 2.6 gal. volume 3 lbs. loading

| Elapsed Time Minutes | Temperature Degrees F. | Speed r.p.m. | |
|---|---|---|---|
| 0 | 70 | 3500 | |
| 10 | 160 | 500 | pigments, plasticizer and stabilizer added |
| 15 | 260 | 2000-3000 | |
| 30 |  | 500 | cooling |
| 60 | 70 | — | |

Examples 1 and 2 demonstrate decorative, inlaid floor coverings which constitute preferred embodiments of this invention and which comprise:

a) a substrate sheet of conventional type nonasbestos belt, b) a gelled, thin, white, or tinted, printable plastisol coating either non-foamable or foamable over said substrate, prepared from effective amounts of a formulation comprising:
   a PVC dispersion resin, preferably having a k value of about 62,
   a PVC extender resin, preferably having a k value of about 60,
   a plasticizer, preferably a phthalate such as di(2-ethylhexyl) phthalate or butyl benzyl phthalate,
   optionally, a foaming agent,
   a pigment, preferably titanium dioxide,
   a crystalline calcium carbonate, and
   a barium-zinc type stabilizer c) a print layer of one or more inks made from effective amounts of a formulation comprising:
   a PVC and PVC-PVAc resin copolymer blend,
   one or more pigments,
   a solvent, preferably consisting essentially of methyl ethyl ketone and xylene, and
   a dispersion aid;

d) gelled, selectively applied adhesive layers made from effective amounts of formulations comprising:
   a PVC dispersion resin, preferably having a k value of about 68,
   a PVC extender resin, preferably having a k value of about 60,
   a plasticizer, preferably butyl benzyl phthalate or di-isononyl phthalate, and
   a barium-zinc type stabilizer, and e) a mixture of gelled, transparent and colored pearls, wherein the pearls are about 50% transparent and about 50% colored, evenly and densely distributed over the surface, prepared from effective amounts of a formulation comprising:
   a PVC suspension resin, preferably coarse and having a k value of about 65,
   a plasticizer, preferably butyl benzyl phthalate,
   a barium-zinc stabilizer, and, optionally,
   a pigment or a color selected from the group consisting of red iron oxide, yellow iron oxide, chrome yellow, molybdate orange, carbon black, titanium oxide, quinanthrone red, phthallo blue and phthallo green.

Although the foregoing discussion describes this invention in terms of floor or wall covering products, this invention is intended to encompass any covering including, but not necessarily limited to, floor or wall covering, which incorporates selectively applied matrix layers of discreet, low aspect ratio particles embedded in a resinous coating.

While the invention has been described with respect to certain embodiments thereof, it will be apparent to those skilled in the art that various changes and modifications may be made without departing from the spirit and scope of the invention.

What is claimed is:

1. A decorative, inlaid floor or wall covering product which comprises:
   a) a substrate,
   b) a printed layer applied over and in contact with said substrate wherein said printed layer is a gelled or foamed resinous layer, the surface of which has been printed with an ink, c) one selectively deposited adhesive matrix layer overlaying a part of said printed layer, the adhesive matrix layer consisting essentially of an adhesive in which are embedded spherical or spheroidal particles having an aspect ratio no greater than about 2:1, and d) at least one wearlayer.

2. The product of claim 1 wherein the substrate is a flexible mat or a non-asbestos felt sheet.

3. The product of claim 1 wherein said printed layer is visible through said selectively deposited adhesive matrix layer.

4. The product of claim 3 wherein said printed layer is in the form of a pattern or design.

5. The product of claim 1 wherein the part of said printed layer which is overlayed by said selectively deposited adhesive matrix layer is obscured.

6. The product of claim 2 wherein the part of said substrate which is overlayed by said selectively deposited adhesive matrix layer is obscured.

7. The product of claim 4 wherein said selectively deposited adhesive matrix layer is in register with said printed layer.

8. The product of claim 7 wherein the spherical or spheroidal particles are a blend of pigmented and transparent particles.

9. The product of claim 1 wherein the spherical or spheroidal particles are resinous particles and are a blend of pigmented and transparent particles.

10. A decorative, inlaid floor or wall covering which comprises:

a) a substrate, and b) more than one selectively deposited adhesive matrix layers, each overlaying a part of said substrate, the adhesive matrix layers each consisting essentially of an adhesive in which are embedded spherical or spheroidal particles having an aspect ratio no greater than about 2:1, wherein at least two of said selectively deposited adhesive matrix layers are comprised of different transparent and/or colored adhesives; and/or particles of different compositions, sizes and/or colors; and/or different loadings of particles.

11. The product of claim 10 wherein the substrate is a flexible mat or a non-asbestos felt sheet.

12. The product of claim 11 further comprising a printed layer applied over and in contact with said substrate wherein said printed layer is a gelled or foamed resinous layer, the surface of which has been printed with an ink.

13. The product of claim 12 wherein said printed layer is visible through at least one of the selectively deposited adhesive matrix layers.

14. The product of claim 13 wherein said printed layer is in the form of a pattern or design.

15. The product of claim 11, wherein at least one selectively deposited adhesive matrix layer obscures the part of said substrate which it overlays.

16. The product of claim 14 wherein at least one selectively deposited adhesive matrix layer is in register with said printed layer.

17. The product of claim 16 wherein the particles are a blend of pigmented and transparent particles.

18. The product of claim 10 further including a latex layer overlaying and in contact with the substrate.

19. The product of claim 10 wherein said selectively deposited adhesive matrix layers are coated with at least one wearlayer.

20. A process for making a decorative inlaid floor covering which comprises the sequential steps of:

a) over the surface of the substrate, optionally printing with one or more inks to make a printed layer;

b) selectively coating a part of the substrate or optional printed layer with a layer of ungelled vinyl plastisol adhesive;

c) depositing a substantially uniform layer of particles consisting essentially of spherical or essentially spherical particles having an aspect ratio no greater than about 2:1;

d) removing excess particles;

e) heating at a sufficient temperature for a sufficient time to embed said spherical or essentially spherical particles in said ungelled vinyl plastisol adhesive and to gel the vinyl plastisol adhesive, thereby forming a selectively deposited adhesive matrix layer; and f) optionally repeating steps b), c), d) and e).

* * * * *